(12) United States Patent
Smith et al.

(10) Patent No.: US 10,085,586 B2
(45) Date of Patent: Oct. 2, 2018

(54) DISPENSING NUTRIENTS

(71) Applicant: ICON Health & Fitness, Inc., Logan, UT (US)

(72) Inventors: Tony Smith, River Heights, UT (US); William T. Dalebout, North Logan, UT (US); Jared Willardson, Smithfield, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 482 days.

(21) Appl. No.: 14/842,235

(22) Filed: Sep. 1, 2015

(65) Prior Publication Data

US 2016/0058245 A1    Mar. 3, 2016

Related U.S. Application Data

(60) Provisional application No. 62/044,692, filed on Sep. 2, 2014.

(51) Int. Cl.
*A47J 31/00*    (2006.01)
*A47J 31/40*    (2006.01)

(52) U.S. Cl.
CPC .................................. *A47J 31/401* (2013.01)

(58) Field of Classification Search
CPC ............................. A47J 31/402; A47J 31/401
See application file for complete search history.

(56) References Cited

U.S. PATENT DOCUMENTS

| | | | |
|---|---|---|---|
| 6,766,656 B1* | 7/2004 | Crisp, III | B67D 1/0057 222/129 |
| 2006/0278093 A1 | 12/2006 | Biderman et al. | |
| 2007/0073557 A1 | 3/2007 | Abramson | |
| 2008/0206429 A1 | 8/2008 | Guerrero et al. | |
| 2012/0285986 A1* | 11/2012 | Irvin | B67D 1/0041 222/1 |

FOREIGN PATENT DOCUMENTS

EP    2292126    5/2012

* cited by examiner

*Primary Examiner* — Tony G Soohoo
*Assistant Examiner* — Anshu Bhatia
(74) *Attorney, Agent, or Firm* — Ray Quinney & Nebeker

(57) ABSTRACT

A system for dispensing a nutrient includes a dispensing device having a container, an orifice defined in the container, and a receiver that receives communications from an activity collecting device. The container dispenses the nutrient contained therein through the orifice in response to a communication from the activity collecting device.

20 Claims, 12 Drawing Sheets

| Nutritional Deficit | | Drink Composition | |
| --- | --- | --- | --- |
| Nutrient | Amount | Nutrient | Amount |
| Creatine Kinase | % | Creatine Kinase | % |
| Protein | % | Protein | % |
| Water | % | Water | % |
| Carbohydrates | % | Carbohydrates | % |
| Sodium | % | Sodium | % |
| Chloride | % | Chloride | % |
| Potassium | % | Potassium | % |
| Magnesium | % | Magnesium | % |
| Calcium | % | Calcium | % |
| Phosphate | % | Phosphate | % |
| Vitamin D | % | Vitamin D | % |
| Vitamin C | % | Vitamin C | % |

Display

DISPENSING NUTRIENTS

RELATED APPLICATIONS

This application claims priority to U.S. Patent Application Ser. No. 62/044,692 titled "Dispensing Nutrients" and filed on 2 Sep. 2014, which application is herein incorporated by reference for all that it discloses.

BACKGROUND

While numerous exercise activities exists that one may participate in, exercise may be broadly broken into the categories of aerobic exercise and anaerobic exercise. Aerobic exercise generally refers to activities that substantially increase the heart rate and respiration of the exerciser for an extended period of time. This type of exercise is generally directed to enhancing cardiovascular performance. This exercise usually includes low or moderate resistance to the movement of the individual. For example, aerobic exercise includes activities such as walking, running, jogging, swimming or bicycling for extended distances and extended periods of time.

Anaerobic exercise generally refers to exercise that strengthens skeletal muscles and usually involves the flexing or contraction of targeted muscles through significant exertion during a relatively short period of time and/or through a relatively small number of repetitions. For example, anaerobic exercise includes activities such as weight training, push-ups, sit-ups, pull-ups, or a series of short sprints.

During aerobic and anaerobic exercise, the human body uses vitamins, minerals, water, carbohydrates, and other nutrients to cause the muscles to contract. Further, muscles are often damaged during exercise, and the body uses other types of nutrients, such as proteins, to repair muscles and/or otherwise recover from the workout. Thus, those who engage in exercise often try to also consume nutritious foods to stay healthy.

One type of system for assisting with proper nutrition is disclosed in U.S. Patent Publication No. 2006/0278093 issued to Eytan Biderman. In this reference, a device for preparing a fluid food at a desired consumption temperature on demand has two reservoirs of water, a container containing a formula, a data processor and a controller for dispensing water of the correct temperature from each of the reservoirs and the formula from the container into a vessel. Also provided are methods for preparing specialized foods at desired consumption temperatures on demand, and methods for marketing both foods and food-preparation devices. Other types of systems are described in U.S. Patent Publication No. 2007/0073557 issued to Fredric D. Abramson and European Patent Application EP 2,292,126 issued to Tom Bulgin.

SUMMARY

In one embodiment, a system for dispensing a nutrient includes a dispensing device having a container, an orifice defined in the container, and a receiver in communication with an activity collecting device. The container dispenses the nutrient contained therein through the orifice in response to a communication from the activity collecting device.

The system may include a platform positioned to receive the nutrient as the nutrient is dispensed from the orifice.

The system may include an actuator that opens the orifice based on data from the activity collecting device.

The dispensing device may include a liquid dispenser.

The dispensing device may include a mixing mechanism that mixes the nutrient with a liquid.

The dispensing device may include additional containers constructed to hold additional nutrients.

The system may include an electronic table that associates a type of nutrient with at least some of the additional containers.

The system may include a processor and memory. The memory may include instructions executable by the processor to determine a user activity performed by a user and determine an amount of the nutrient to dispense based at least in part on the user activity.

The system may include instructions executable by the processor to send a command to open the orifice of the container based on the amount.

The system may include instructions executable by the processor to select a nutrient type based on the user activity.

The dispensing device may include a display that presents information based on data from the activity collecting device.

The information based on the data from the activity collecting device may include a nutritional determination caused by a user activity.

The information based on the data from the activity collecting device may include an amount of nutrient dispensed from the container.

In one embodiment, a dispensing device for dispensing nutrients includes multiple containers constructed to hold multiple nutrient types, orifices defined in the multiple containers, a receiver in communication with an activity collecting device, an actuator that dispenses nutrient by opening the orifices based on data from the activity collecting device, and a processor and memory. The memory includes instructions executable by the processor to determine a user activity performed and determine an amount of the nutrients to dispense based on the user activity.

The dispensing device may include a platform that receives the nutrients as the nutrients are dispensed from the orifices.

The dispensing device may include a liquid dispenser.

The dispensing device may include a mixing mechanism to mix the nutrients with a liquid.

The dispensing device may include instructions executable by the processor to send a command to open the orifices of one of the multiple containers based on the amount.

The dispensing device may include instructions executable by the processor to select a nutrient type based on the user activity.

In one embodiment, a dispensing device for dispensing nutrients includes multiple containers constructed to hold multiple nutrient types, orifices defined in the multiple containers, a receiver in communication with an activity collecting device, an actuator that dispenses nutrient by opening the orifices based on data from the activity collecting device, electronic table that associates a type of nutrient with at least some of the multiple containers, and a processor and memory. The memory includes instructions executable by the processor to determine a user activity performed, select at least one nutrient type to dispense based on the user activity, determine an amount of the at least one selected nutrient to dispense based on the user activity, and send a command to open the orifices of at least one of the multiple containers based on the selected nutrient type and the amount.

BRIEF DESCRIPTION OF THE DRAWINGS

The accompanying drawings illustrate various embodiments of the present apparatus and are a part of the speci

FIG. 5 illustrates a perspective view of an example of display of a dispensing device in accordance with the present disclosure.

Throughout the drawings, identical reference numbers designate similar, but not necessarily identical, elements.

DETAILED DESCRIPTION

Figure 1:
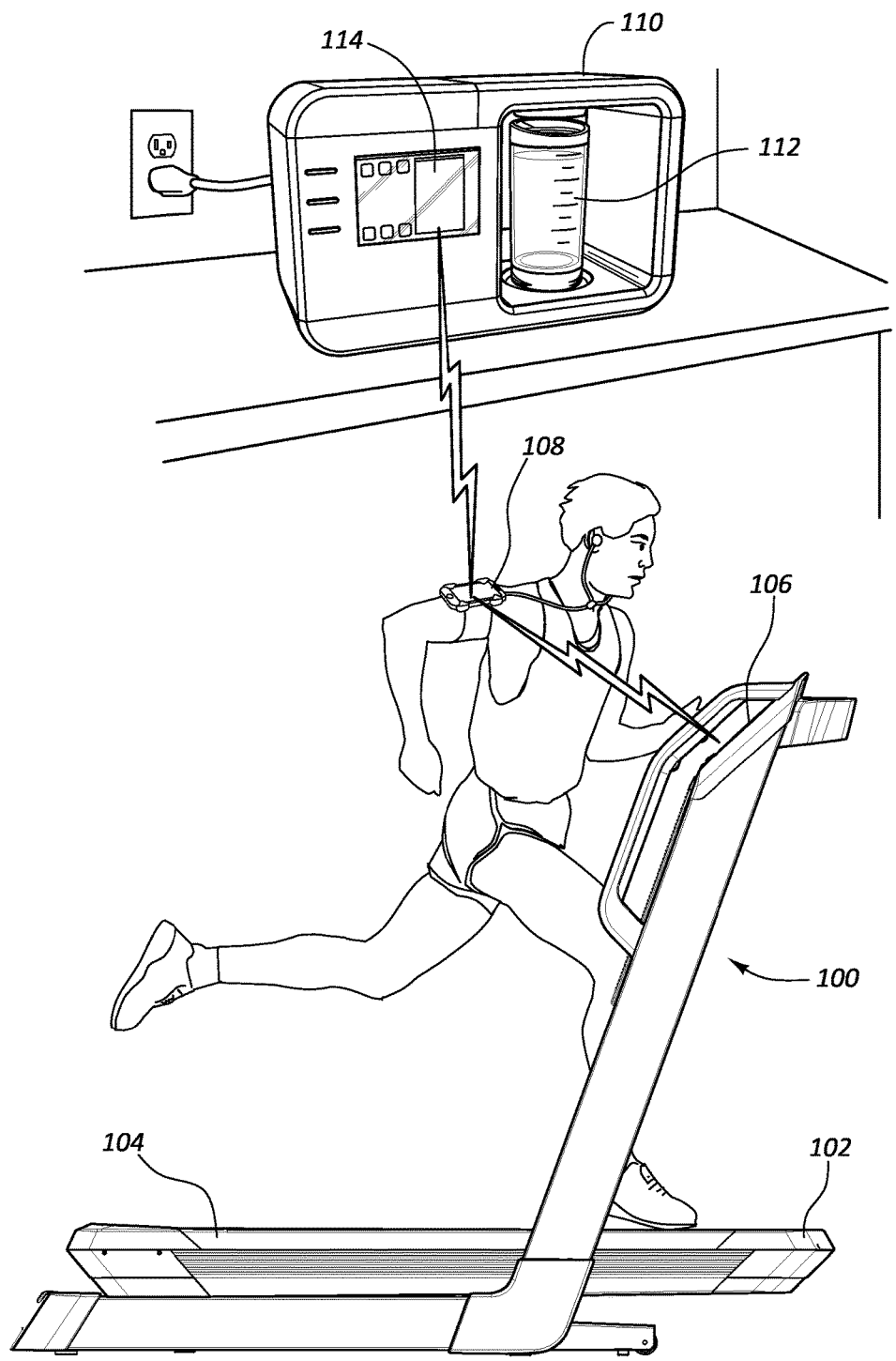
- FIG. 1 illustrates a perspective view of an example of an activity collecting device in communication with a dispensing device in accordance with the present disclosure.

After a fitness activity, a user is often depleted of nutrients. Generally, the degree of depletion that the user is depleted depends on the intensity and type of fitness activity performed. Often, the user desires to replenish the nutrients lost during a workout, but may not know how many nutrients were actually lost.

The principles described in the present disclosure include a system for dispensing a nutrient, such as one or more nutrients lost during the user's fitness activity. For example, if the user recently completed an endurance workout, the user may lack a combination of carbohydrates and proteins as well as specific minerals and vitamins. In situations where an activity collecting device tracks parameters of the workout, the information about the workout can be analyzed and sent to a dispensing device. Based on the received information, a customized amount of nutrients can be dispensed into a cup on a platform of the dispensing device. The dispensed nutrients can replace the nutrients lost during the workout.

In some examples, a user activity is a workout, which can include anaerobic exercises, aerobic exercises, or combinations thereof. Further, a user activity may include playing basketball, dodge ball, baseball, football, capture the flag, volleyball, badminton, tennis, softball, soccer, hockey, water polo, other activities, or combinations thereof. Further, a user activity may include other active activities often performed for recreational purposes such as wrestling, fencing, curling, skiing, running, walking, swimming, stretching, rowing, dancing, golfing, horseback riding, kayaking, skateboarding, snorkeling, diving, staking, scuba diving, rock climbing, boxing, snow shoeing, martial arts, yoga, other activities, or combinations thereof. For the purposes of this disclosure, a user activity may also include daily activities such as gardening, shoveling, watching television, sleeping, standing in line, reading, eating, playing with kids, cleaning, cooking, shopping, performing home repairs, other types of activities, or combinations thereof. While some of these activities are not physically intense, an activity collecting device can nevertheless factor in an exertion by the user in performing these activities to determine the amount of nutrients for the user.

In some cases, the user makes a request of the dispensing machine for when to dispense the nutrients. In other examples, times for dispensing the nutrients are preprogrammed into the dispensing device. In yet other examples, the dispensing device determines when to dispense the nutrients based on when it appears that the user has accomplished the workout. In yet additional examples, the nutrients may be dispensed as the user works out over time. In this example, the activity collecting device can send real time fitness information to the dispensing device during the workout. In yet another example, the dispensing device learns when to dispense the nutrient based on user requests over time.

Further, an activity collecting device may gather data about the user from different sources. For example, the activity collecting device may include a component that tracks activities that a user has already done. Further, the activity collecting device may also include a component that can receive fitness goals, workout schedules, planned workout activities, health conditions, or combinations thereof. The additional information may be inputted into the activity collecting device through a user interface, which may be located locally on the activity collecting device or remotely, such as through a wireless connection.

Figure 2:
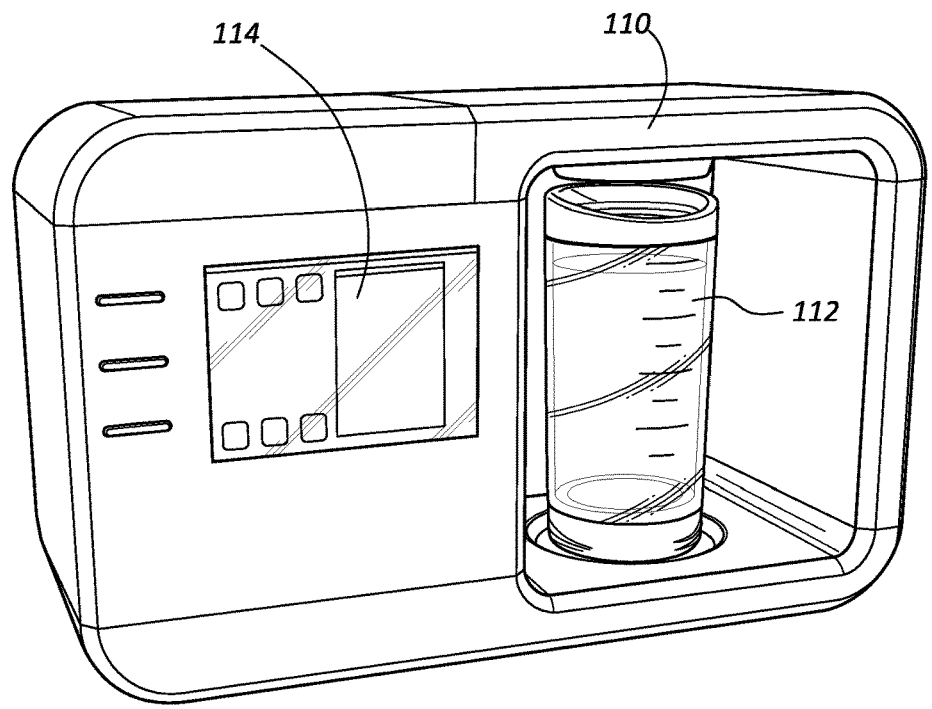
FIG. 2 illustrates a perspective view of an example of a dispensing device in accordance with the present disclosure.
Figure 3:
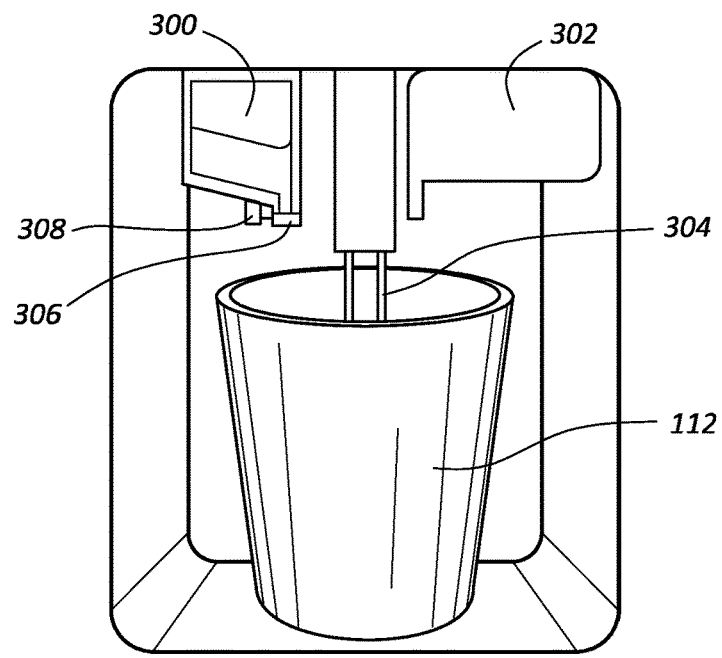
FIG. 3 illustrates a perspective view of an example of a dispensing device in accordance with the present disclosure.

Particularly, with reference to the figures, FIGS. 1-3 depict an exercise machine 100, such as a treadmill. The treadmill includes a running deck 102 with a tread belt 104 on which a user can walk and/or run. A console 106 of the treadmill includes a user interface that includes controllers and a display. Through the controllers, the user can adjust the tread belt 104 speed, adjust the running deck's incline, select a preprogrammed workout, adjust a speaker volume, perform another task, or combinations thereof. Exercise statistics about the user's workout can be presented in the display, such as time duration of the workout, the speed of the tread belt 104, the incline of the running deck 102, the user's heart rate, the number of calories burned by the user, the distance traveled by the user, other parameters, or combinations thereof.

In the example of FIG. 1, the exercise machine 100 is an activity collecting device because at least one detail about the user's workout is gathered by the exercise machine 100. In some examples, the exercise machine 100 stores the workout details locally. In other situations, the workout details are sent to another device. In the illustrated example, the workout details are sent to a mobile device 108 worn by the user during the workout. The mobile device 108 may be a smart phone, a digital device, another type of mobile device, or combinations thereof. The mobile device 108 may be in communication with a cloud based device that can store the workout details.

In the illustrated example, the exercise machine 100 is in communication with the mobile device 108, and the mobile device is in communication with a dispensing device 110. In other examples, the exercise machine 100 may be in direct communication with the dispensing device 110. In yet other examples, the cloud based device or another type of device that stores the workout details is in communication with the dispensing device 110.

The dispensing device 110 is can receive the workout details from an activity collecting device, such as the exercise machine 100, the mobile device 108, the cloud based device, another type of device that can store details about the workout, or combinations thereof. The dispensing device 110 can determine the nutrients that the user should ingest based on the details of the workout. For example, the dispensing device 110 may include programmed logic and tables that allow the dispensing device 110 to determine that after the specific details of the user's workout, that the user should ingest a specific number of proteins, a specific number of carbohydrates, a specific type of mineral and its associated amount, a specific type of vitamin and its associated amount, other types of nutrients, or combinations thereof. While this example has been described with reference to the dispensing machine making the nutrient determination, any appropriate device may make this determination based on the details of the workout. For example, any of the activity collecting devices may determine the nutrients to be ingested by the user based on the workout.

Based on the determination, the dispensing device 110 dispenses the appropriate amount and types of nutrients into a cup 112 or another type of container appropriately positioned to receive the nutrients. Each of the nutrients may be stored in the dispensing device 110. For example, specific powders containing one or more of the desired nutrients may be stored in a cartridge 300 or another type of container of the dispensing machine. The dispensing device 110 may cause one or more cartridges 300 to dispense an appropriate amount of each powder into the cup 112. The combination of the dispensed powders may include at least the appropriate amounts of each type of desired nutrient.

The nutrients may be dispensed out of the cartridges through an orifice 306. The orifice 306 can be opened by activating an actuator 308 in communication with a processor. In some examples, the actuator 308 may be a solenoid, a screw motor, a linear actuator, a magnetic actuator, a hydraulic actuator, a pneumatic actuator, another type of actuator, or combinations thereof.

In response to dispensing the nutrients, the user can manually fill the cup 112 with water, milk, or another type of liquid and mix the liquid with the nutrients to make a recovery drink. In other examples, the liquid is added to the cup 112 with a liquid dispenser 302 of the dispensing device 110. The dispensing device 110 may also determine the appropriate amount of water or other liquid that the user should ingest based on the workout.

In some examples, the user can manually mix the nutrients with the liquid. In other examples, the dispensing device 110 includes a mixing mechanism that can cause the nutrients to mix with the liquid. In the example of FIG. 3, the dispensing device 110 may include a mechanical agitator that can extend into the cup 112 to mix the nutrients and liquid. The agitators 304 may be beaters, hooks, rods, blades, other types of mechanical agitators, or combinations thereof. The mechanical agitator 304 may move vertically by extending into and/or retracting away from the cavity of the cup 112. In other examples, the mechanical agitator 304 is vertically fixed in place, and the cup 112 has to be maneuvered into place around the agitator to be appropriately positioned to receive the nutrients. In yet other examples, the mixing mechanism includes subjecting the cup 112 to forces that cause the nutrients and liquid to mix. For example, a vibrator, an ultrasonic vibrator, a magnetic mechanism, another type of device, or combinations thereof may apply forces on the cup 112 to cause the nutrients and liquid to mix.

While the above examples describe the nutrients being in the form of a powder, the nutrient may take any appropriate form. For example, the nutrients may be dispensed in the form of a pill, paste, sauce, slurry, pellet, liquid, mist, other form, or combinations thereof. Further, the nutrients can be dispensed into a bowl, plate, or another type of container. In these examples, the nutrients may be dispensed onto noodles, cereal, fruit, soups, other types of food, or combinations thereof.

The dispensing device 110 may include a display 114 that presents to the user the status of dispensing and/or mixing. For example, the dispensing device 110 may communicate to the user through the display 114 that nutrient dispensing is underway, liquid dispensing is underway, mixing is in process, nutrient determinations are underway, other statuses, or combinations thereof.

Further, the dispensing device 110 may include a user interface where the user can input commands to the dispensing device 110. For example, the user may input a flavor preference, a command to increase a particular amount of a specific nutrient, allergy information, weight, height, gender, age, other types of information, or combinations thereof.

Figure 4:
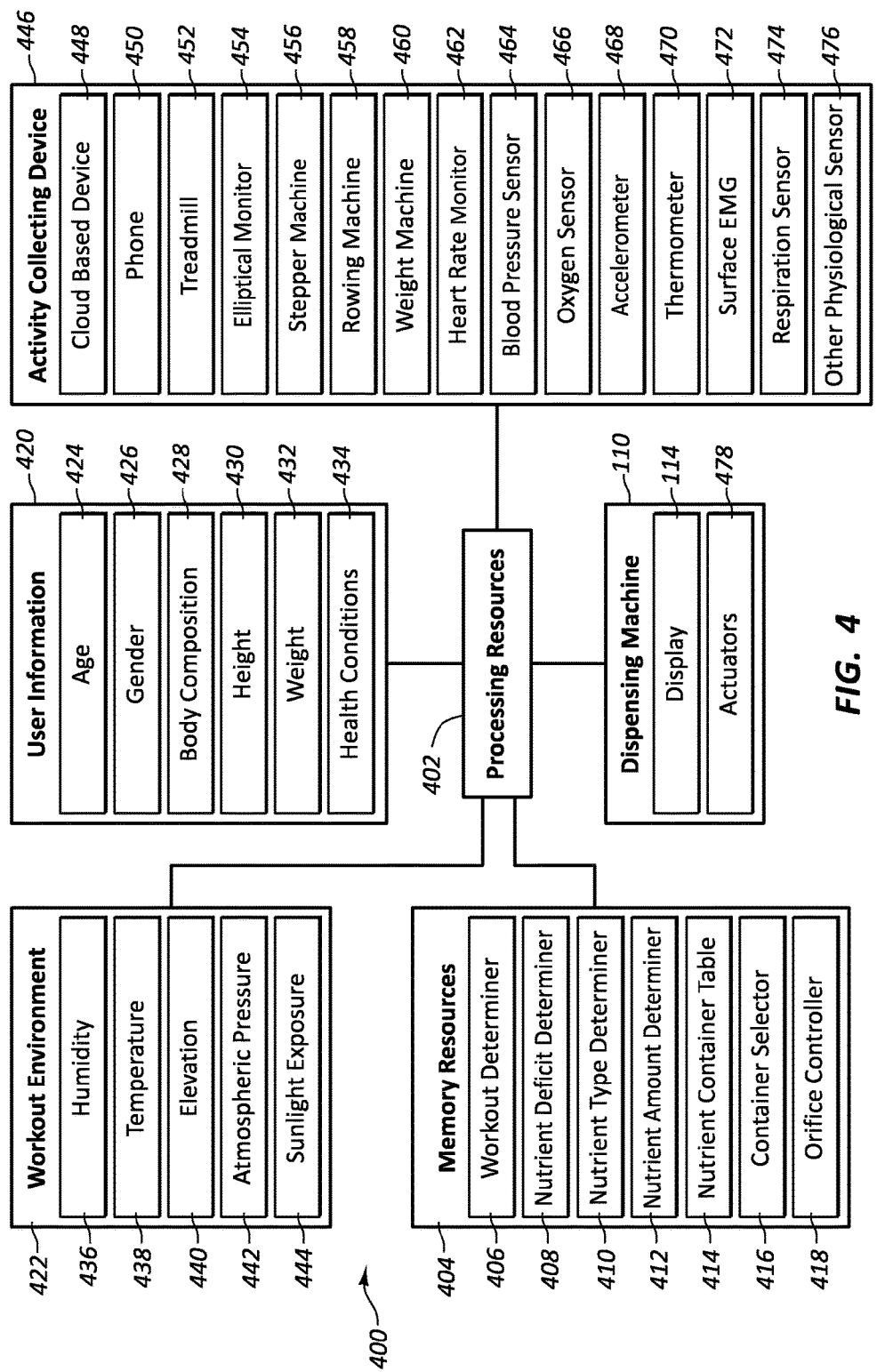
FIG. 4 illustrates a block diagram of an example of a system for dispensing nutrients in accordance with the present disclosure.

FIG. 4 illustrates a block diagram of an example of a system 400 for dispensing nutrients. The system 400 may include a combination of hardware and program instructions for executing the functions of the system 400. In this example, the system 400 includes processing resources 402 that are in communication with memory resources 404. Processing resources 402 include at least one processor and other resources used to process programmed instructions. The memory resources 404 represent generally any memory capable of storing data such as programmed instructions or data structures used by the system 400. The programmed instructions shown stored in the memory resources 404 include a workout determiner 406, a nutrient deficit determiner 408, a nutrient type determiner 410, a nutrient amount determiner 412, a container selector 416, and an orifice controller 418. The data structures shown stored in the memory resources 404 include a nutrient container table 414.

Further, the processing resources 402 may be in communication with user information 420 and/or workout environment information 422 that may be stored in the memory resources 404. For example, the processing resources 402 may be in communication with an activity collecting program that stores the user information 420, such as iFit which is available through www.ifit.com and administered through ICON Health and Fitness, Inc. located in Logan, Utah, U.S.A. In some examples, the user information includes the user's age data 424, gender data 426, body composition data 428, height data 430, weight data 432, health conditions data 434, other types of information, or combinations thereof. Further, the workout environment information 422 may be accessed through a weather station, a map, a home climate system, a website, another type of information source, or combinations thereof. In some examples, the workout environment information 422 includes humidity data 436, temperature data 438, elevation data 440, atmospheric pressure data 442, sunlight exposure data 444, other types of environmental data, or combinations thereof.

The processing resources 402, memory resources 404, and activity collecting devices 446 may communicate over any appropriate network and/or protocol. For example, these devices may be capable of communicating using the ZigBee protocol, Z-Wave protocol, BlueTooth protocol, Wi-Fi protocol, Global System for Mobile Communications (GSM) standard, another standard, or combinations thereof.

The memory resources 404 include a computer readable storage medium that contains computer readable program code to cause tasks to be executed by the processing resources 402. The computer readable storage medium may be a tangible and/or non-transitory storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, magnetic based memory, other types of memory, or combinations thereof.

The workout determiner 406 represents programmed instructions that, when executed, cause the processing resources 402 to determine the workout that the user has performed. In some examples, the workout determiner 406 receives a message from the user and/or an activity collecting device that the user has completed a workout. The activity collecting device 446 may be, at least in part, a cloud based device 448, a phone 450, a treadmill 452, an elliptical machine 454, a stepper machine 456, a rowing machine 458, a weight machine 460, a heart rate monitor 462, a blood pressure sensor 464, an oxygen sensor 466, an accelerometer 468, a thermometer 470, a surface electromyography sensor 472, a respiration sensor 474, another type of physiological sensor 476, or combinations thereof. Thus, any of these devices or similar types of devices can gather information that can be used to determine what the user accomplished during his or her workout.

The workout determiner 406, may use any appropriate mechanism or information to determine when to determine the workout. In some examples, the workout determiner 406 passively receives the fitness data from the activity collecting device 446. In other examples, the workout determiner 406 actively requests the fitness data from the activity collecting device 446. The user may manually request the dispensing device 110 to make a recovery drink. In this example, the dispensing device 110 may cause the workout determiner 406 to request the workout details from the activity collecting device 446. In other situations, the workout determiner 406 receives a continuous feed from the activity collecting device 446 and determines based on the changes in activity when the user desires to have a recovery drink. Further, the workout determiner 406 may use, at least in part, historical information of when the user has requested a drink to decide when to determine the workout. Also, the user may have an option of preformatting the dispensing machine to cause the workout determiner to automatically determine the workout at a predetermined time of day, week, month, another time period, or combinations thereof.

The nutrient deficit determiner 408 represents programmed instructions that, when executed, cause the processing resources 402 to determine the nutrients that the user needs to recover from his or her workout. In some examples, the nutrient deficit determiner 408 also considers the time of day, whether the user has recently had a meal, whether the user has recently awoken from sleeping at night, whether the user performed the exercise in a dry climate, whether the user was exposed to a significant amount of sunlight before, during, or after the workout, other factors that may indicate what types of minerals, vitamins, proteins, carbohydrates, etc. are needed by the user. These determinations include the user's recent fitness activities, which may include playing a sport, doing household work, sleeping, lighting weights, performing an aerobic exercise, doing another type of activity, or combinations thereof. In some examples, the activity collecting device 446 is a wearable activity collecting device that is constructed to measure the amount and types of movements performed by the user to help the nutrient deficit determiner 408. This wearable activity collecting device may include one or more accelerometers to multiple body movement in multiple directions and at least one physiological sensor to determine how the user's body is responding to the activity.

The nutrient deficit determiner 408 may also consider physiological parameters of the user recorded during the workout. For example, the nutrient deficit may be determined to be different if the user's heart rate frequently approaches the user's maximum heart rate verses the user merely approaching 60% of the user's maximum heart rate occasionally during the workout even if the energy expended in both workouts is consistent. Further, the condition of the user's muscles may also be used to determine the nutrient deficit. For example, if physiological sensors indicate that the user's muscles are cramping in response to the workout, the nutrient deficit may also be adjusted.

In some scenarios, the user inputs the amounts and types of food that he or she eats into the activity collecting device. In this situation, the nutrient deficit determiner 408 may determine based on the historical diet of the user, the types of nutrition that the user needs. For example, if the nutrient deficit determiner 408 determines that the user has not consumed an appropriate amount of a certain type of food, the nutrient deficit determiner 408 can cause the lacking nutrient to be added with the other nutrients.

Further, the nutrient deficit determiner 408 may also consider the health goals of the user. For example, if the user desires to gain additional muscle, the nutrient deficit determiner 408 may adjust the determined nutrient deficit to include the additional nutrients that the user needs to build additional muscle. Similarly, the nutrient deficit determiner 408 may reduce certain types of nutrients, like carbohydrates, if the user inputs a goal to loose fat. But, in this example, the nutrient deficit determiner 408 may also determine that additional nutrients are needed to enhance a fat loss such as metabolism boosters or types of nutrients.

The nutrient type determiner 410 represents programmed instructions that, when executed, cause the processing resources 402 to determine a type of nutrient to dispense. Based on the nutrient deficit, the nutrient type determiner 410 may determine the types of nutrients that satisfy the user's nutrient needs. Likewise, the nutrient amount determiner 412 represents programmed instructions that, when executed, cause the processing resources 402 to determine an amount of each determiner type of nutrient to dispense.

The container selector 416 represents programmed instructions that, when executed, cause the processing resources 402 to select an appropriate container of nutrient to dispense. The container selector 416 can refer to a nutrient container table 414 that associates each container with the type of nutrient it contains.

The orifice controller 418 represents programmed instructions that, when executed, cause the processing resources 402 to control the orifice of each container to ensure that the appropriate amount of nutrient is dispensed. For example, the orifice controller 418 may be in communication with an actuator 478 that can cause the orifice to open for a selected amount of time to cause an appropriate amount of nutrient to be dispensed before the orifice closes. In some cases, the orifice controller is in communication with a nutrient sensor that determines the overall volume of nutrient in the container to ensure that the appropriate amount nutrient has been dispensed. In some examples, the actuators 478 are also used to position the cartridge 300 over a platform that supports the cup 112. In this manner, the cartridges 300 can be moved as appropriate to be out of the way when not dispensing the nutrient.

Further, the memory resources 404 may be part of an installation package. In response to installing the installation package, the programmed instructions of the memory resources 404 may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources 404 can include integrated memory such as a hard drive, a solid state hard drive, or the like.

In some examples, the processing resources 402 and the memory resources 404 are located within the dispensing device 110, the mobile device 108, the exercise machine 100, the cloud based device, another type of device, or combinations thereof. The memory resources 404 may be part of any of these device's main memory, caches, registers, non-volatile memory, or elsewhere in their memory hierarchy. Alternatively, the memory resources 404 may be in communication with the processing resources 402 over a network. Further, the data structures, such as the libraries, may be accessed from a remote location over a network connection while the programmed instructions are located locally. Thus, the system 400 may be implemented on the dispensing device 110, the exercise machine 100, a user device, a mobile device 108, a phone, an electronic tablet, a wearable computing device, a head mounted device, a server, a collection of servers, a networked device, a watch, or combinations thereof. These implementation may occur through input mechanisms, such as push buttons, touch screen buttons, voice commands, dials, levers, other types of input mechanisms, or combinations thereof. Any appropriate type of wearable device may include, but are not limited to glasses, arm bands, leg bands, torso bands, head bands, chest straps, wrist watches, belts, earrings, nose rings, other types of ring, necklaces, garment integrated devices, other types of devices, or combinations thereof.

FIG. 5 illustrates a diagram of an example of a display 500 incorporated into the dispensing device 110. The display 500 may include a capacity to present any appropriate type of information to the user. As mentioned above, the display can present a status to the user. Additionally, the display 500 can also present the nutrient information about the user's fitness activity as well as the composition of the drink. In the illustrated example, both the nutrient deficit and drink composition a nutrient type is associated with an amount. The depicted nutrients include creatine kinase, protein, water, carbohydrates, sodium, chloride, potassium, magnesium, calcium, phosphate, vitamin D, and vitamin C. While the illustrated example includes selected displayed nutrients, any appropriate type of nutrient can be presented to the user for a nutritional deficit and/or drink composition. For example, a non-exhaustive list of other nutrients that may be displayed include thiamin, riboflavin, niacin, folate, pyridoxine, cobalamin, pantothenic acid, biotin, vitamin A, vitamin E, vitamin K, iron, zinc, copper, selenium, iodine, fluoride, chromium, manganese, molybdenum, magnesium, glutamine, glycine, carnitine, arginine, taurine, lysine, other vitamins, other minerals, other amino acids, other proteins, other herbs, other hormones, other molecules, other carbohydrates, other nutrients, or combinations thereof.

FIGS. 6-10 depict select examples of dispensing devices 110 that may be used in accordance with the principles described herein. But, any appropriate type of dispensing device 110 may be used to dispense the nutrient, which may or may not incorporate the features of the dispensing devices 110 described below.

Figure 6:
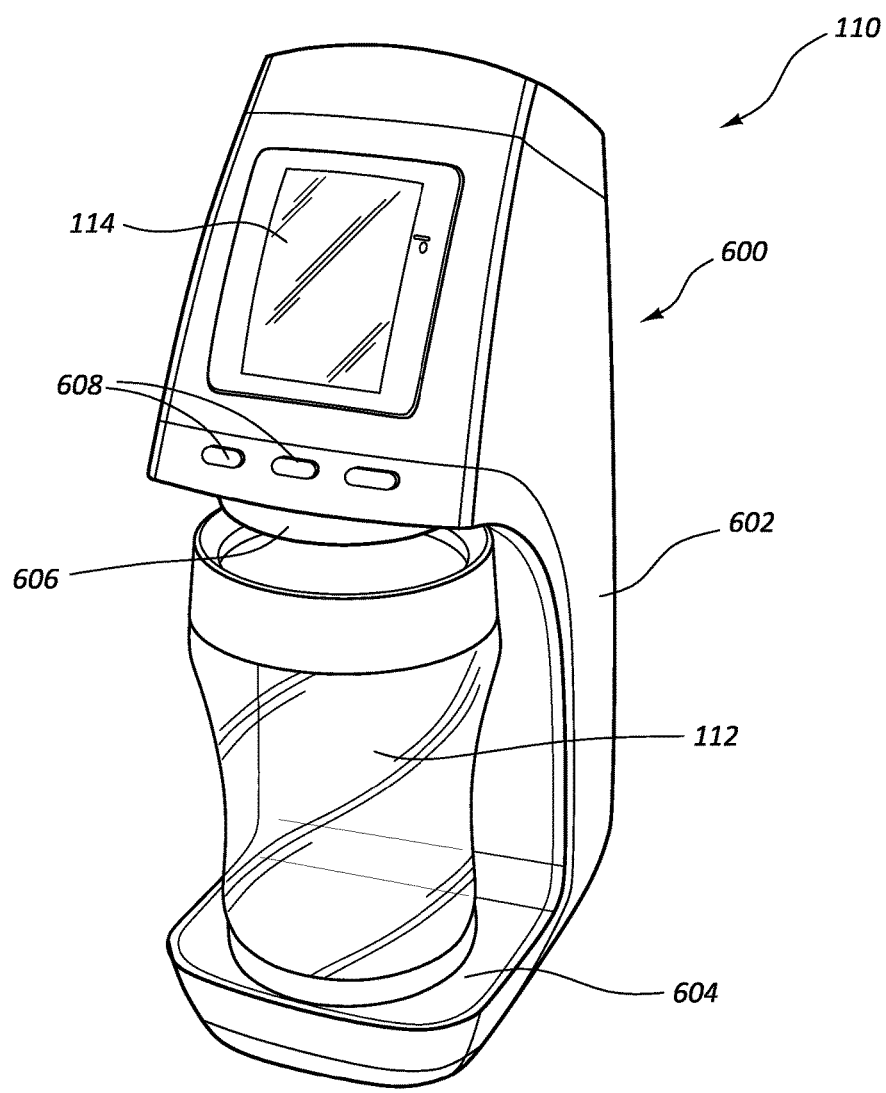
FIG. 6 illustrates a perspective view of an example of a dispensing device in accordance with the present disclosure.
Figure 7:
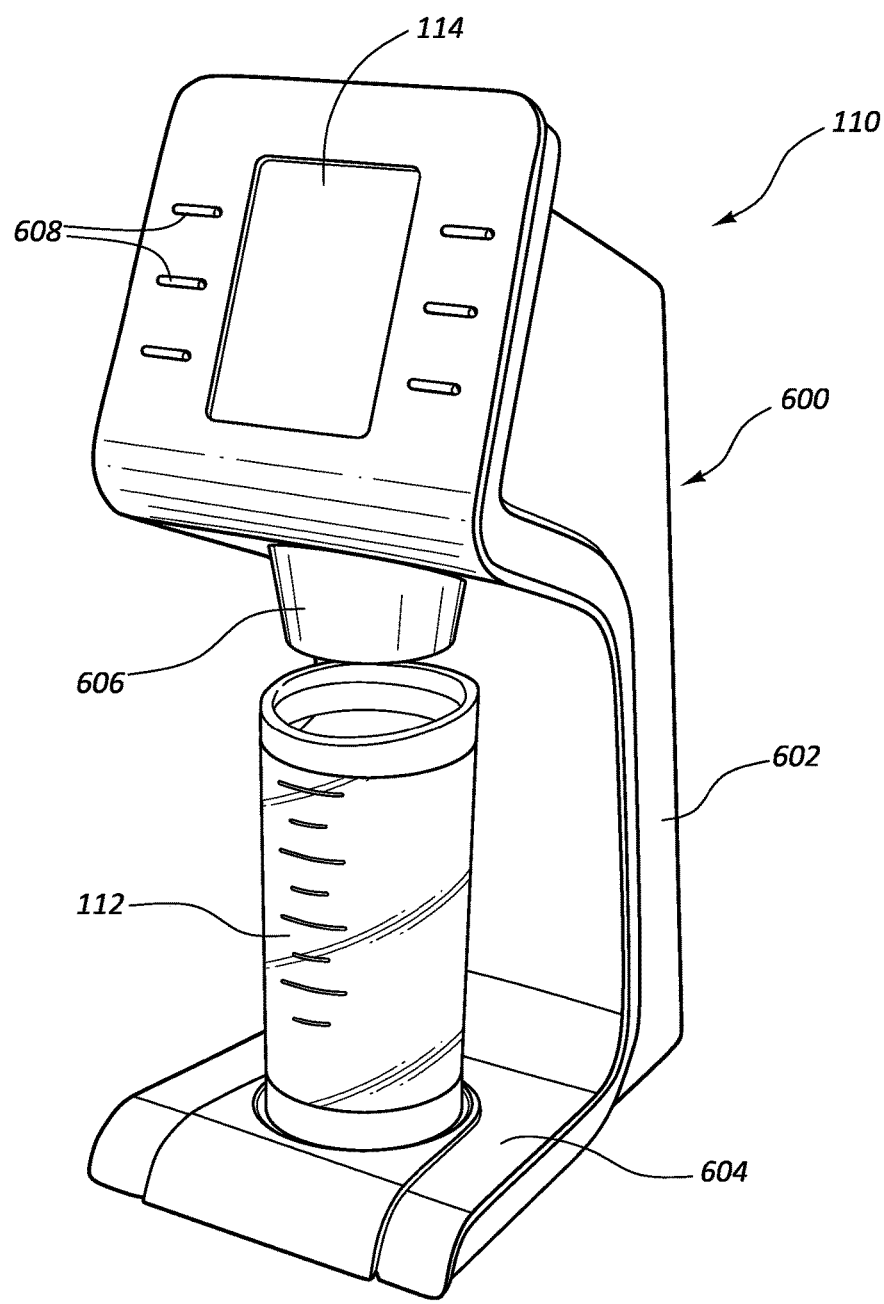
FIG. 7 illustrates a perspective view of an example of a dispensing device in accordance with the present disclosure.

FIGS. 6 and 7 illustrate perspective views of examples of dispensing devices 110 in accordance with the present disclosure. In these examples, the dispensing device 110 includes an upper portion 600 supported by back wall 602. A platform 604 protrudes away from the back wall 602 under the upper portion 600 to form a surface to support a cup 112. The upper portion 600 has an internal volume which can store multiple containers of nutrient. In response to a command, the dispensing device 110 can open an orifice of the cartridges 300 to release the nutrient through a spout 606 positioned over the platform 604. The upper portion 600 includes a display 114 and at least one button 608 to communicate a command to the dispensing device 110.

Figure 8:
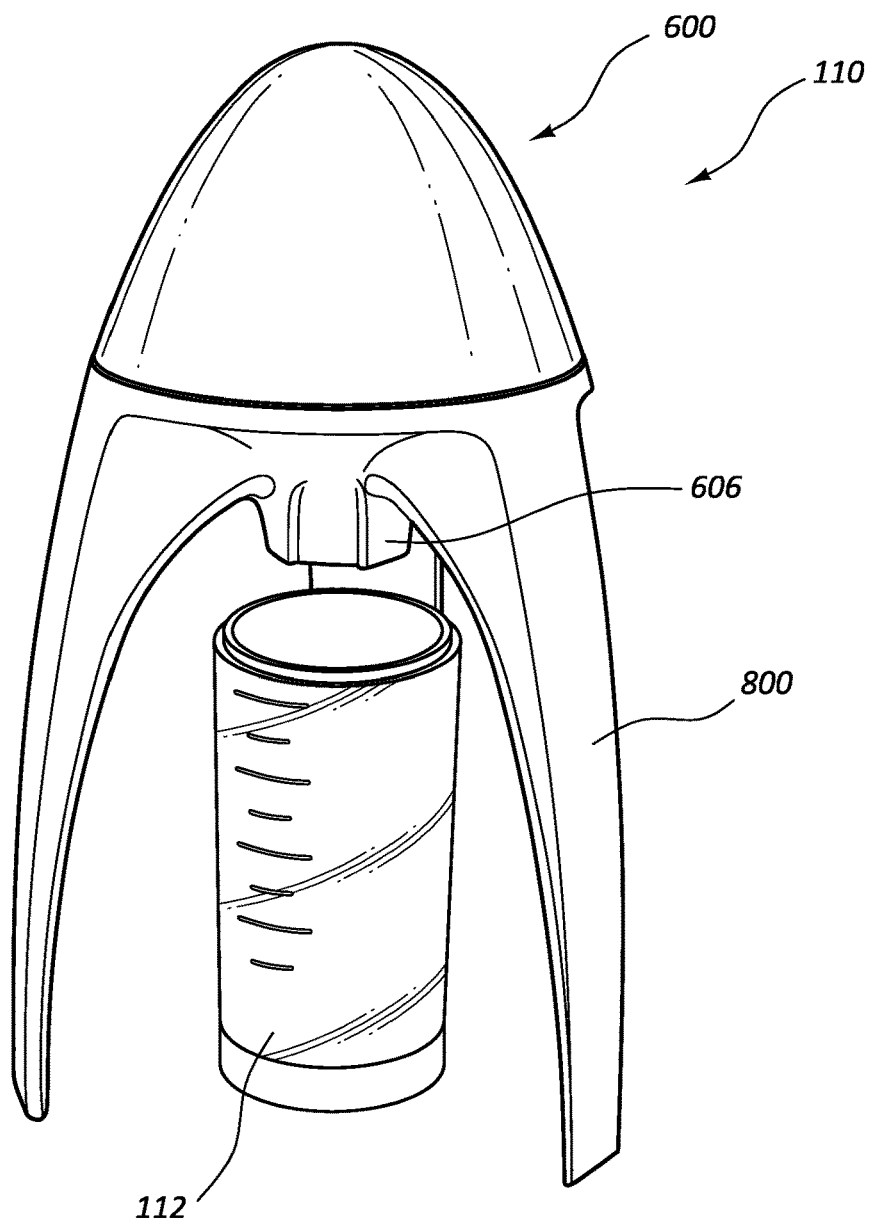
FIG. 8 illustrates a perspective view of an example of a dispensing device in accordance with the present disclosure.

FIG. 8 illustrates a perspective view of an example of a dispensing device 110 in accordance with the present disclosure. In this example, the dispensing device 110 includes an upper portion 600 balanced on three legs 800 although any appropriate number of legs may be used. The spacing between the legs 800 is wide enough to pass a cup 112 through the spacing to position the cup 112 under the spout 606.

The cartridges stored in the upper portion 600 are arranged to dispense the nutrient through the spout 606. In the illustrated example, the dispensing device 110 does not have a display or a user interface. The commands to the dispensing device 110 are received through a hardwired or wireless receiver.

Figure 9:
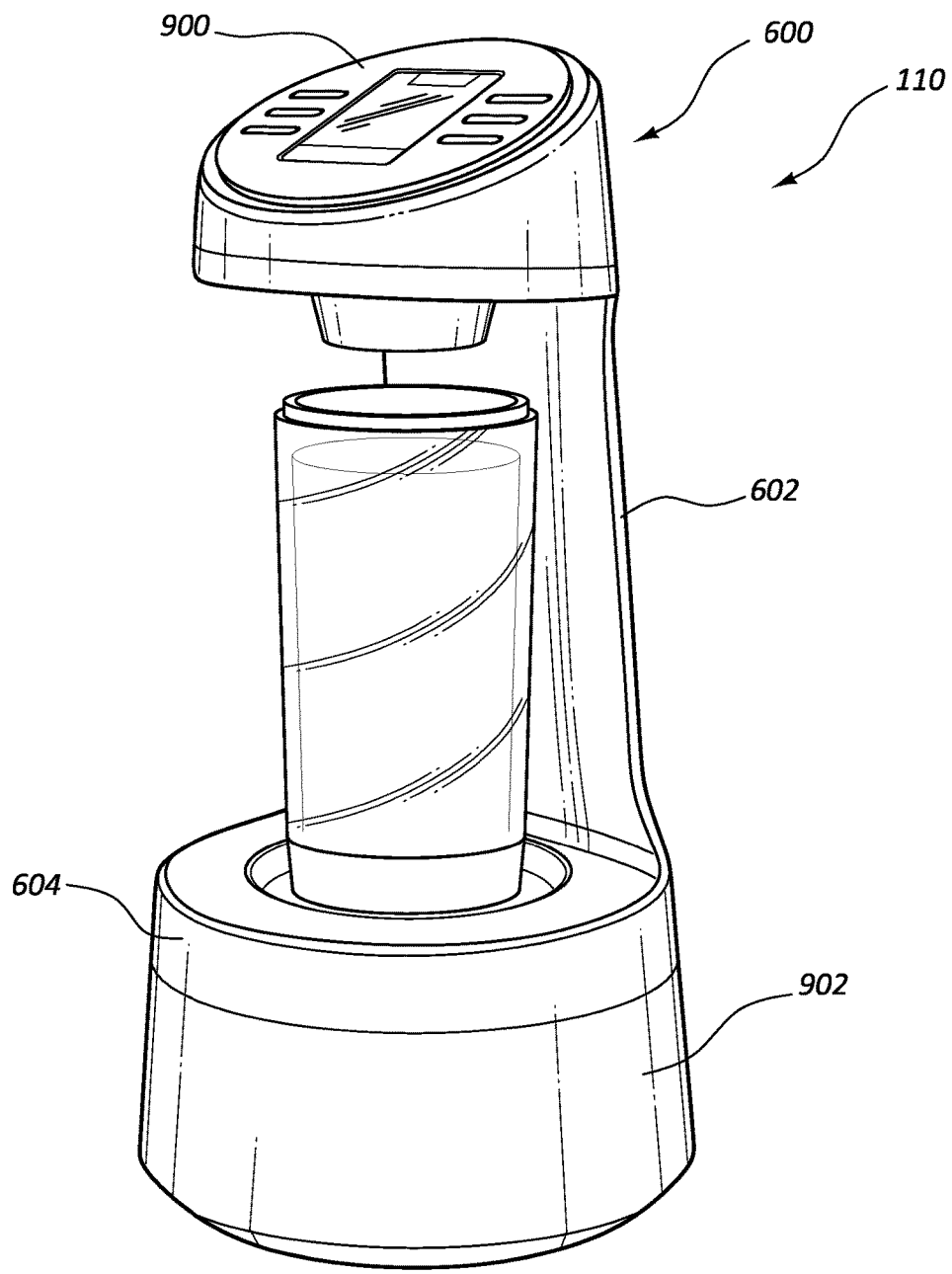
FIG. 9 illustrates a perspective view of an example of a dispensing device in accordance with the present disclosure.

FIG. 9 illustrates a perspective view of an example of a dispensing device 110 in accordance with the present disclosure. In this example, the dispensing device 110 includes an upper portion 600 that is connected to a base 902 that forms the platform 604 through a back wall 602. The upper portion includes a top surface 900 that incorporates the display 114 and buttons 608. Further, the base 902 is sufficiently heavy to provide additional stability to the dispensing device 110. In some examples, the volume of the platform may be used to store containers of nutrients. In these examples, the containers may be removed from the platform 604 and reattached to the upper portion 600 to dispense the nutrient. But, in some examples, the nutrients are dispensed from the containers located in the base 902. This example may include a suction device that moves the nutrients from the platform 604 to the upper portion 600 where the nutrient can be released through the spout 606. Tubes for carrying these nutrients may be incorporated into the back wall 602 or may be externally attached to the dispensing machine. In some situations, a screw auger or other type of conveying mechanism may be used to transport the nutrients from the base 902 to the spout 606. In other cases, the nutrient containers are stored in the upper portion 600 and use gravity, in part, to dispense the nutrient out of the spout 606.

Figure 10:
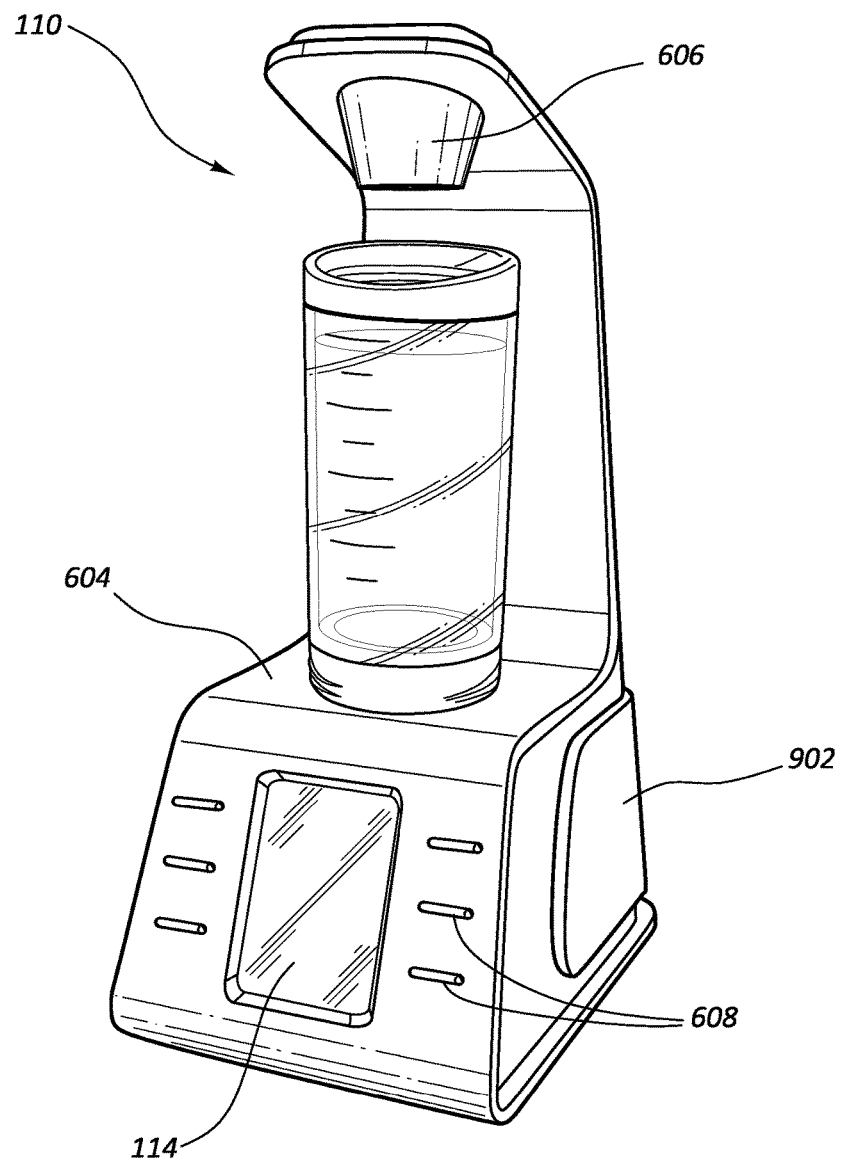
FIG. 10 illustrates a perspective view of an example of a dispensing device in accordance with the present disclosure.

FIG. 10 illustrates a perspective view of an example of a dispensing device 110 in accordance with the present disclosure. In this example, the dispensing device 110 includes a base 902 that forms the platform 604. The display 114 and buttons 608 are incorporated into the base 902. The illustrated example may also store the nutrient containers within the base 902 and use a transporting mechanism, such as tubes with a suction device, to carry the nutrients from the base to the spout 606 for dispensing.

In general, the dispensing devices may include other features that have not been depicted in the figures. For example, the dispensing devices may be portable so that the user can bring the dispensing device with him or her to the gym, track, or other location. In these examples, the user's workout can be recorded with a wearable activity collecting device and is in wireless communication with portable dispensing device. In these situations, a temperature setting may be used to keep liquid, such as water or milk, contained in the dispensing device at an appropriate temperature regardless of the ambient temperature of the user's workout location.

In other situations, the dispensing device is integrated into a kitchen or other house setting. This dispensing devices can be powered through nearby alternating current power sockets through a power cord, solar panel, batteries, another power source, or combinations thereof.

Further, any appropriate mechanism may be used to cause the nutrient to be dispensed from the containers. For example, gravity may be used to pull nutrient out of the containers when a container orifice is opened. In other cases, the containers may be pressurized to dispense controlled amounts of nutrient.

While the above examples have been described as being incorporated into specific types of exercise machines, the principles herein may be incorporated into any appropriate type of exercise machine or exercise accessory. For example, other types of exercise machines may include exercise machines that allow a user to do exercises that work latissimus dorsi muscles, pectoral muscles, bicep muscles, tricep muscles, deltoid muscles, trapezius muscles, other muscles, and combinations thereof. Further, the activity collecting device may be integrated into a pull-up bar, workout bench, a weight stack structure, a dumb bell, a self-propelling bike, athletic shoes, a skiing machine, a squat machine, another type of exercise accessory and/or machine, or combinations thereof.

Figure 11:
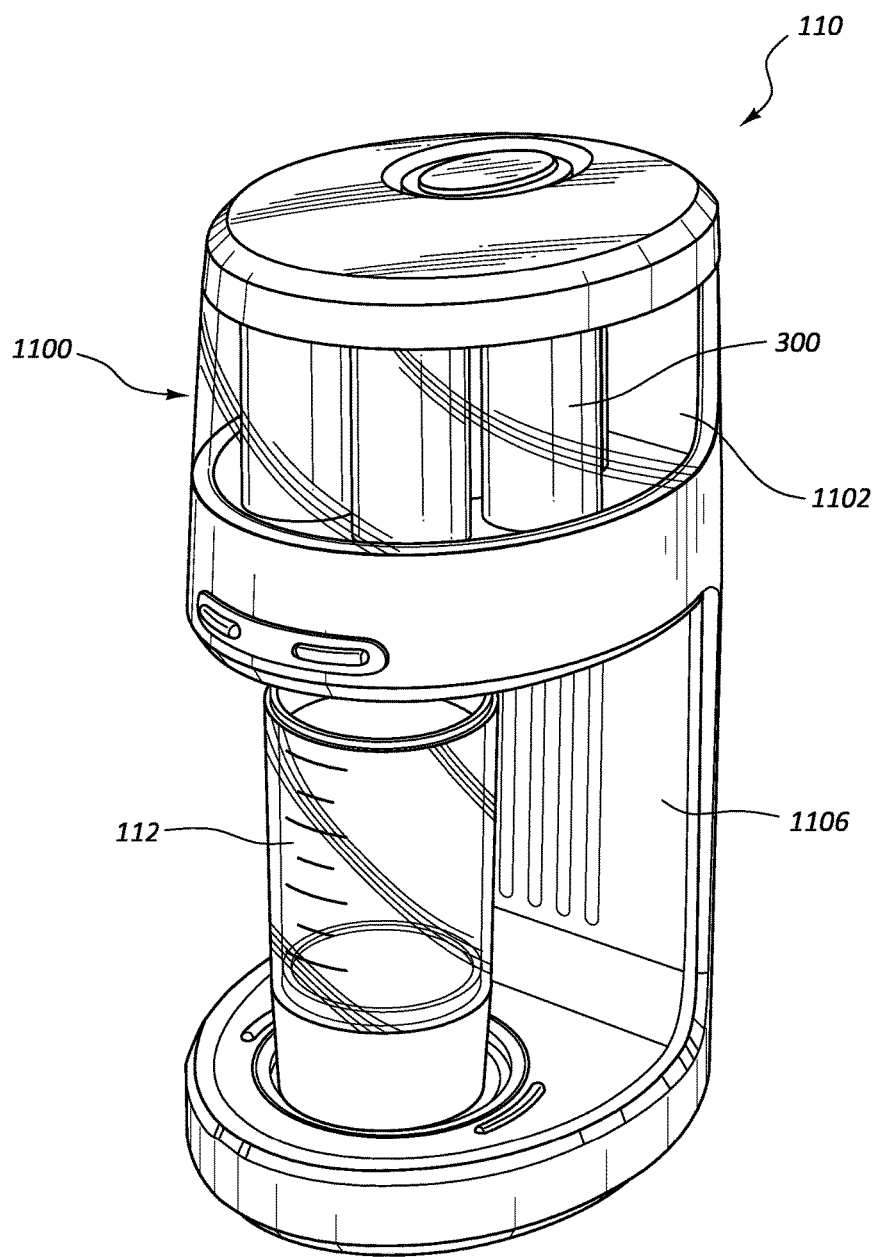
FIG. 11 illustrates a perspective view of an example of a dispensing device in accordance with the present disclosure.
Figure 12:
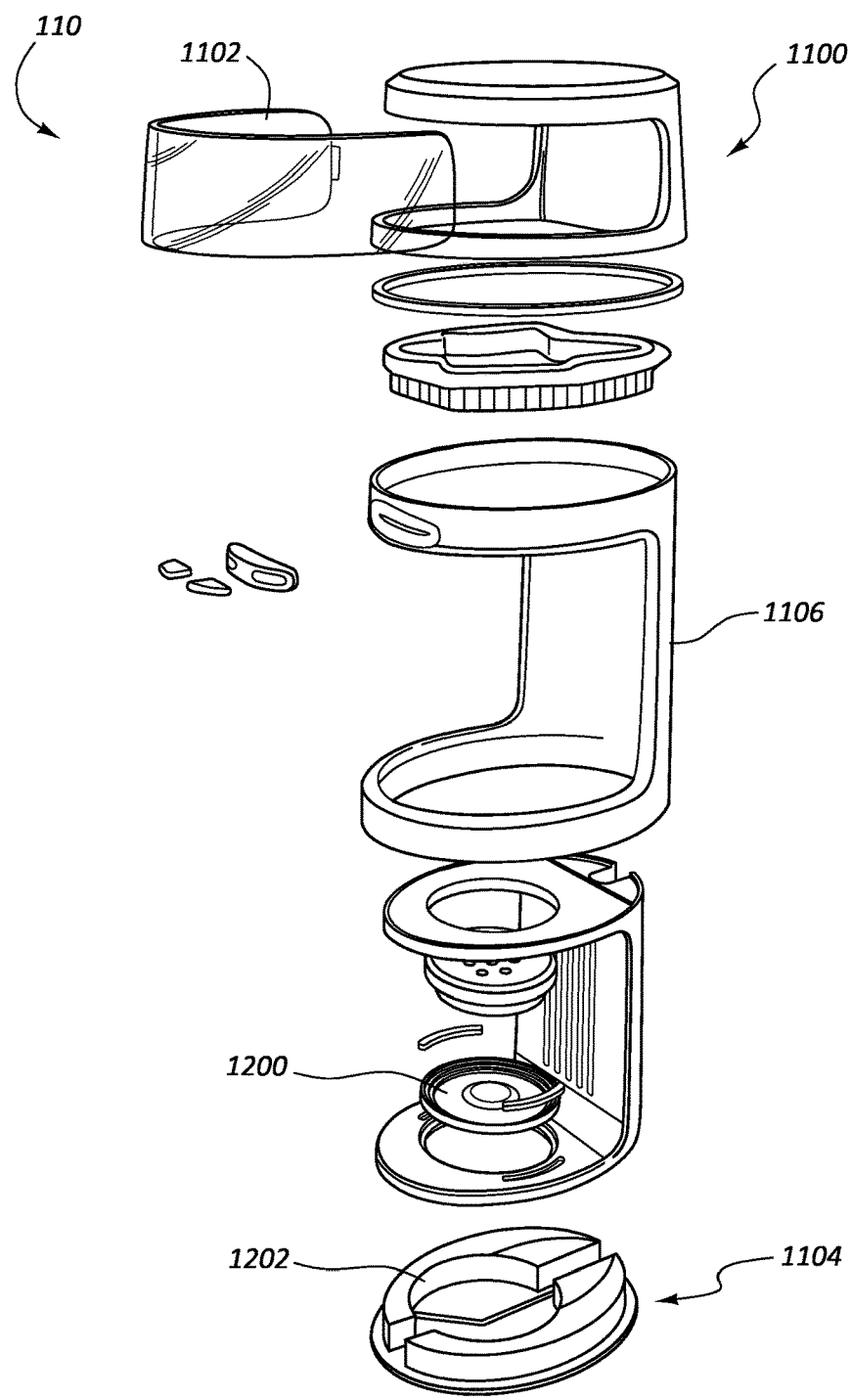
FIG. 12 illustrates an exploded view of an example of a dispensing device in accordance with the present disclosure.
Figure 13:
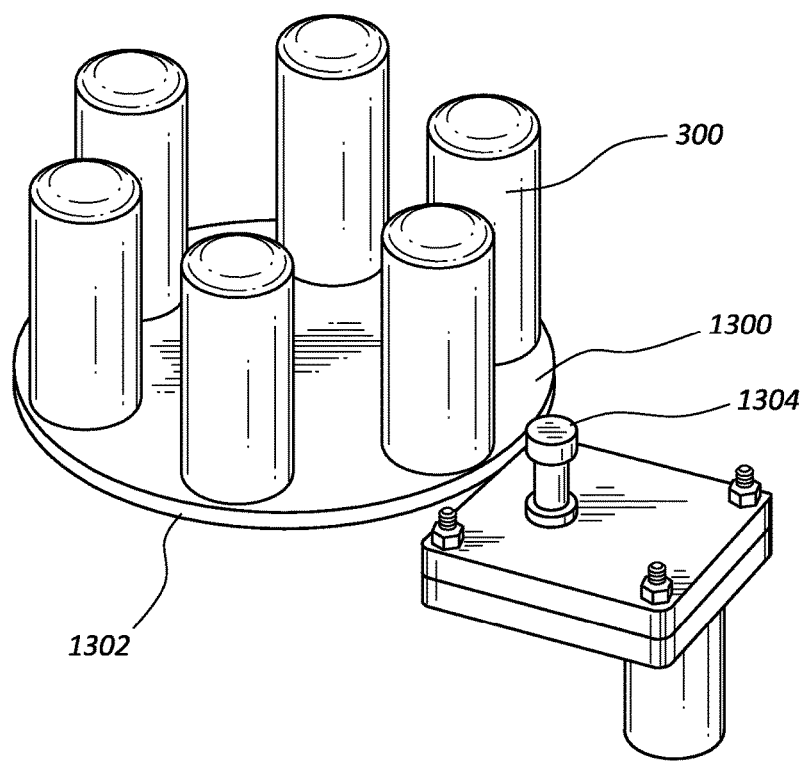
FIG. 13 illustrates a perspective view of an example of a selecting mechanism in a dispensing mechanism in accordance with the present disclosure.

FIGS. 11-13 depict an example of a dispensing device 110 in accordance with the principles described in the present disclosure. In this example, the dispensing device 110 includes a cartridge section 1100 located over the spout when the dispending device 110 is placed in an upright position. Multiple cartridges 300 are located within the cartridge section 1100 and are supported on a turn table 1300 that is arranged to position the cartridges 300 over the spout to release nutrients into the cup 112 or other type of container.

The turn table 1300 may be rotated through a mechanical engagement between an edge 1302 of the turn table 1300 and a pinion 1304 that is driven by a motor. Any appropriate surface features may be incorporated into the surfaces of the turn table's edge 1302 and the pinion. For example, these surfaces may incorporate a rough surface that provides sufficient friction so that when the pinion 1304 rotates, the turn table 1300 will follow. In other examples, the pinion 1304 and the turn table's edge 1302 may include intermeshing teeth that provide a mechanical grip to assist in rotating the turn table's edge.

The cartridges 300 are replaceable within the cartridge section 1100. A removable cover 1102 can be removed to access the cartridges 300. In some examples, the cover 1102 is transparent or at least partially transparent and the cartridges 300 are also transparent so that the user can see how much contents remain in the cartridges 300. As a result, the user can see when the cartridges ought to be replace or refilled. In other examples, a sensor may be incorporated into the dispensing device 110 that determines when the cartridge ought to be replaced or refilled. The sensor may cause a notification to be presented into the display 114 of the dispensing device. In some examples, the user may have an option that causes the dispensing device to order an appropriate cartridge when the contents of the cartridge falls below a predetermined volume threshold.

The cup 112 or other container may be positioned by the user under the spout when the dispensing device 110 is in the upright position. The cup 112 may rest on a platform 1104 that is shaped to receive the cup 112. In some examples, an insert 1200 is incorporated into an opening 1202 of the platform 1104 and is shaped to receive the cup 112.

The cartridge section 1100 may be spaced apart from the platform 1104 supporting the cup 112 by a back support 1106. The platform 1104 may include a sufficient footprint and weight to balance the cartridge section.

GENERAL DESCRIPTION

In general, the invention disclosed herein may provide a user with an easy to use, accurate mechanism for obtaining nutrition after a workout. Generally, users who exercise on a regular basis desire to have post workout recovery drinks after a workout as soon as possible. With the principles described herein, the user can have a recovery drink and/or meal that is customized to their needs and the specific details of their workout.

Further, users often estimate their nutritional needs after a workout. But, these estimates are often inaccurate because the user does not always know the number of calories burned, water lost, minerals lost, vitamins lost, glycogen lost, other factors concerning the user's nutrient deficit, and combinations thereof after their workout. The principles described herein allow the user to have an accurate process for determining the nutritional needs. Additionally, the user is spared from having to perform these calculations on his or her own.

The dispensing device can provide the user with the benefit of dispensing the nutrient directly into a cup or other container. As described above, some examples of the principles herein also add liquid and can mix the liquid with the powdered nutrient. Thus, a user can proceed directly to the dispensing machine after his or her workout and have a customized recovery drink ready. This convenience increases the likelihood that the user will take the recovery drink and also ensures that the user gets the proper nutrition.

As a result of having the proper nutrition, the user can recover faster from his workouts, which allows the user to have better performance in subsequent workouts or athletic games. Thus, the principles described herein may enhance the user's athletic performance and improve his or her health.

The dispensing device may be include multiple types of nutrients stored in containers internal to the dispensing device. In some examples, a single container of a single type of nutrient is used. But, in other examples, a single container that houses multiple types of nutrients is stored in the dispensing device. But, in other situations, the dispensing device includes multiple containers that house different types of nutrients. As a result, the dispensing device, the activity collecting device, another type of device, or combinations thereof can determine how much of each nutrient is desirable for the user. Thus, if the user is heavily deficient in a particular type of nutrient, the desired nutrient can be appropriately added without causing other nutrients that are not needed to be included in the post workout meal.

Further, the principles described herein also conserve the nutrient by avoiding waste. For example, a user may overestimate his or her nutritional needs. In some circumstances, the body cannot absorb or use nutrients over certain amounts. Thus, over estimating a nutritional need may result in wasted nutrients. The dispensing device described herein can reduce the likelihood that the nutrition are overestimated, thereby saving the nutrient and saving the user the cost of purchasing unnecessary nutrient.

In some cases, the dispensing device includes a platform on which a cup or other container can rest. This platform provides the cup with a stable surface when receiving nutrients. In some cases, the platform is shaped to help the user locate an appropriate location on the platform for placing the cup so that the cup is centered under the spout.

The dispensing device may include nutrient dispensers, liquid dispensers, flavoring dispensers, and other types of dispensers to create the user's recovery drink and/or meal. In other examples, just a subset of these types of dispensers is incorporated into the dispensing machine.

Further, a mixing mechanism may be incorporated into the dispensing device. This mixing mechanism may include a mechanical agitator, a vibrator, or another mechanism for mixing the drink and/or nutrient. The mixing mechanism can save the user time by mixing the constituents of the drink. Further, the mixing mechanism may include the capability of thoroughly mixing the drink, which may make the drink more palatable to the user.

The dispensing device or the activity collecting device may include an electronic table that associates the type of nutrient with the containers stored in the dispensing device. The table allows the dispensing device to identify the appropriate container with the desired nutrient. As a result, the dispensing device can cause an actuator to position and/or open the appropriate container so that the nutrient contained therein is dispensed through the dispensing device's spout. When a nutrient is to be dispensed through the spout, the orifice of the container may be positioned over the spout. In other situations, a tube, chute, or other type of guide may be positioned to receive the dispensed nutrient from the container's orifice and direct the nutrient to the spout where the nutrient exists the dispensing device.

Further, the display incorporated into the dispensing device can present to the user the types and amounts of nutrients desirable for the user. Additionally, the display can present to the user the constituents of the user's drink. In some cases, the display can present other information about the drink or dispensed nutrients, including the number of calories in the drink, the temperature of the drink, the time lapse between when the drink was taken by the user and a fitness activity concluded, other information, or combinations thereof.

Also, the dispensing device and/or activity collecting device can consider additional information beyond just the fitness activity of the user to determine the user's nutritional needs. For example, the diet of the user may be collected over time. In this scenario, the nutrients that are generally consumed by the user can be reduced in the drink while those nutrients that the user generally lacks from his or her typical diet may be increased in the drink.

The dispensing system may also include the ability to compensate for health conditions of the user. For example, if a user has been diagnosed with low iron, diabetes, or other conditions, the dispensing system may incorporate additional nutrients into the user's diet as appropriate. In some cases, the user's medicine can also be dispensed into the user's drink or meal as appropriate.

In some situations, the user's goals, such as muscle gain or fat loss, can be programmed into the dispensing system to assist the user with the appropriate supplements or restrictions that are appropriate for the user's goals.

Additionally, the dispensing device and/or activity collecting device can provide a user with the appropriate type of drink regardless of whether the user has performed a workout or not. For example, a wearable activity collecting device may indicate the user has just awoken from a night's sleep, but the user causes the dispensing device to receive a command from the user for a drink with the appropriate nutrients. In this example, the user may desire to skip the workout for the day, but he or she may still desire to have a nutritious meal for the day that is tailored to the amount of activity that the user has performed.

Further, the dispensing device may include features that allow the dispensing device to distinguish between users. In some examples, the dispensing machine responses to commands from the activity collecting device that includes a user identification code so that the user is identified. The display of the dispensing device may present the name of the identified user. In this manner, multiple users may use the dispensing device, such as at home or at a gym. In some examples, the activity collecting device communicates with the dispensing device without user input. In other examples, the user sends instructions to the activity collecting device to communicate with the activity collecting device or the user gives the dispensing device instructions to communicate with his or his activity collecting device.

In some examples, the communications between the dispensing device and the activity collecting device are wireless signals. But, any appropriate type of communication may be used in accordance with the principles described herein. For example, the activity collecting device and the dispensing device may both include a Universal Serial Bus (USB) connection where information from the activity collecting device can be downloaded to a portable device and transferred to the dispensing device manually. In other examples, the activity collecting device and the dispensing device may be paired together. In yet other examples, a cable may connect the dispensing device and the activity collecting device. The receiver may receive the information from the activity collecting device regardless of whether the connection is hardwired, wireless, or another type of connection.

The treadmill includes a running deck with a tread belt on which a user can walk and/or run. A console of the treadmill includes a user interface that includes controllers and a display. Through the controllers, the user can adjust the tread belt speed, adjust the running deck's incline, select a preprogrammed workout, adjust a speaker volume, perform another task, or combinations thereof. Exercise statistics about the user's workout can be presented in the display, such as time duration of the workout, the speed of the tread belt, the incline of the running deck, the user's heart rate, the number of calories burned by the user, the distance traveled by the user, other parameters, or combinations thereof.

In some examples, the exercise machine is an activity collecting device because at least one detail about the user's workout is gathered by the exercise machine. In some examples, the exercise machine stores the workout details locally. In other situations, the workout details are sent to another device. In the illustrated example, the workout details are sent to a mobile device worn by the user during the workout. This mobile device may be a smart phone, a digital device, another type of mobile device, or combinations thereof. The mobile device may be in communication with a cloud based device that can store the workout details.

The exercise machine may be in communication with the mobile device, and the mobile device is in communication with a dispensing device. In other examples, the exercise machine may be in direct communication with the dispensing device. In yet other examples, the cloud based device or another type of device that stores the workout details is in communication with the dispensing device.

The dispensing device may receive the workout details from an activity collecting device, such as the exercise machine, the mobile device, the cloud based device, another type of device that can store details about the workout, or combinations thereof. The dispensing device can determine the nutrients that the user should ingest based on the details of the workout. For example, the dispensing device may include programmed logic and tables that allow the dispensing device to determine that after the specific details of the user's workout, that the user should ingest a specific number of proteins, a specific number of carbohydrates, a specific type of mineral and its associated amount, a specific type of vitamin and its associated amount, other types of nutrients, or combinations thereof. While this example has been described with reference to the dispensing machine making the nutrient determination, any appropriate device may make the determination based on the details of the workout. For example, any of the activity collecting devices may determine the nutrients to be ingested by the user based on the workout.

Based on the determination, the dispensing device dispenses the appropriate amount and types of nutrients into a cup or another type of container appropriately positioned to receive the nutrients. Each of the nutrients may be stored in the dispensing device. For example, specific powders containing one or more of the desired nutrients may be stored in a cartridge or another type of container of the dispensing machine. The dispensing device may cause one or more cartridges to dispense an appropriate amount of each powder into the cup. The combination of the dispensed powders may include at least the appropriate amounts of each type of desired nutrient.

The nutrients may be dispensed out of the cartridges through an orifice. This orifice can be opened by activating an actuator in communication with a processor. In some examples, the actuator may be a solenoid, a screw motor, a linear actuator, a magnetic actuator, a hydraulic actuator, a pneumatic actuator, another type of actuator, or combinations thereof.

In response to dispensing the nutrients, the user can manually fill the cup with water, milk, or another type of liquid and mix the liquid with the nutrients to make a recovery drink. In other examples, the liquid is added to the cup with a liquid dispenser of the dispensing device. The dispensing device may also determine the appropriate amount of water or other liquid that the user should ingest based on the workout.

In some examples, the user can manually mix the nutrients with the liquid. In other examples, the dispensing device includes a mixing mechanism that can cause the nutrients to mix with the liquid. The dispensing device may include a mechanical agitator that can extend into the cup to mix the nutrients and liquid. The agitators may be beaters, hooks, rods, blades, other types of mechanical agitators, or combinations thereof. The mechanical agitator may move vertically by extending into and/or retracting away from the cavity of the cup. In other examples, the mechanical agitator is vertically fixed in place, and the cup has to be maneuvered into place around the agitator to be appropriately positioned to receive the nutrients. In yet other examples, the mixing mechanism includes subjecting the cup to forces that cause the nutrients and liquid to mix. For example, a vibrator, an ultrasonic vibrator, a magnetic mechanism, another type of device, or combinations thereof may apply forces on the cup to cause the nutrients and liquid to mix.

While the above examples describe the nutrients being in the form of a powder, the nutrient may take any appropriate form. For example, the nutrients may be dispensed in the form of a pill, paste, sauce, slurry, pellet, liquid, mist, other form, or combinations thereof. Further, the nutrients can be dispensed into a bowl, plate, or another type of container. In this example, the nutrients may be dispensed onto noodles, cereal, fruit, soups, other types of food, or combinations thereof.

The dispensing device may include a display that presents to the user the status of dispensing and/or mixing. For example, the dispensing device may communicate to the user through the display that nutrient dispensing is underway, liquid dispensing is underway, mixing is in process, nutrient determinations are underway, other statuses, or combinations thereof.

Further, the dispensing device may include a user interface where the user can input commands to the dispensing device. For example, the user may input a flavor preference, a command to increase a particular amount of a specific nutrient, allergy information, weight, height, gender, age, other types of information, or combinations thereof.

What is claimed is:

1. A system for dispensing a nutrient, comprising:
a dispensing device, the dispensing device comprising:
a container containing a nutrient;
a receiver that receives communications from a fitness activity collecting device; and
a processor and memory, wherein the memory includes instructions executable by the processor to:
determine a user fitness activity performed by a user; and
determine an amount of the nutrient to dispense based at least in part on the user fitness activity.

2. The system of claim 1, further comprising a platform positioned to receive the nutrient as the nutrient is dispensed from an orifice.

3. The system of claim 1, further comprising an actuator arranged to open an orifice based on data from the fitness activity collecting device.

4. The system of claim 1, wherein the dispensing device further comprises a liquid dispenser.

5. The system of claim 1, wherein the dispensing device further comprises a mixing mechanism that mixes the nutrient with a liquid.

6. The system of claim 1, wherein the dispensing device further comprises additional containers constructed to hold additional nutrients.

7. The system of claim 6, further comprising an electronic table that associates a type of nutrient with at least some of the additional containers.

8. The system of claim 1, further comprising:
an orifice defined in the container through which the nutrient is dispensed; and
an actuator arranged to open the orifice in response to a communication from the fitness activity collecting device.

9. The system of claim 1, comprising further instructions executable by the processor to send a command to open an orifice of the container based on the amount.

10. The system of claim 1, comprising further instructions executable by the processor to select a nutrient type based on the user fitness activity.

11. The system of claim 1, wherein the dispensing device further comprises a display configured to present information based on data from the fitness activity collecting device.

12. The system of claim 11, wherein the information based on the data from the fitness activity collecting device includes a nutritional determination caused by a user fitness activity.

13. The system of claim 11, wherein the information based on the data from the fitness activity collecting device includes an amount of nutrient dispensed from the container.

14. A dispensing device for dispensing nutrients, comprising:
multiple containers constructed to hold multiple nutrient types;
orifices defined in the multiple containers;
a receiver in communication with a fitness activity collecting device;
an actuator that dispenses the nutrient by opening the orifices based on data from the fitness activity collecting device; and
a processor and memory, wherein the memory includes instructions executable by the processor to:
determine a user fitness activity performed; and
determine an amount of the nutrients to dispense based on the user fitness activity.

15. The dispensing device of claim 14, further comprising a platform positioned to receive the nutrients as the nutrients are dispensed from the orifices.

16. The dispensing device of claim 14, further comprises a liquid dispenser.

17. The dispensing device of claim 14, further comprises a mixing mechanism to mix the nutrients with a liquid.

18. The dispensing device of claim 14, comprising further instructions executable by the processor to send a command to open the orifices of one of the multiple containers based on the amount.

19. The dispensing device of claim 14, comprising further instructions executable by the processor to select a nutrient type based on the user fitness activity.

20. A dispensing device for dispensing nutrients, comprising:
multiple containers constructed to hold multiple nutrient types;
orifices defined in the multiple containers;
a receiver in communication with a fitness activity collecting device;
an actuator that dispenses the nutrient by opening the orifices based on data from the fitness activity collecting device;
electronic table that associates a type of nutrient with at least some of the multiple containers; and
a processor and memory, wherein the memory includes instructions executable by the processor to:
automatically determine a user fitness activity performed;
based on the determined user fitness activity performed, automatically select at least one nutrient type to dispense based on the user fitness activity;
automatically determine an amount of the at least one selected nutrient to dispense based on the user fitness activity; and
automatically send a command to open the orifices of at least one of the multiple containers based on the selected nutrient type and the amount.

* * * * *